US008688662B2

(12) United States Patent
Haswell

(10) Patent No.: US 8,688,662 B2
(45) Date of Patent: Apr. 1, 2014

(54) COPY ON ACCESS TO LOCKED OBJECTS

(75) Inventor: Jonathan M. Haswell, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2050 days.

(21) Appl. No.: 10/952,287

(22) Filed: Sep. 28, 2004

(65) Prior Publication Data

US 2006/0074842 A1    Apr. 6, 2006

(51) Int. Cl.
*G06F 7/00* (2006.01)
*G06F 17/00* (2006.01)

(52) U.S. Cl.
USPC .......................................... 707/704; 707/649

(58) Field of Classification Search
USPC ............... 707/8, 200, 203, 204, 704, 649; 395/200; 711/162
See application file for complete search history.

(56) References Cited

U.S. PATENT DOCUMENTS 5,073,851 A * 12/1991 Masterson et al. ............ 711/140
5,163,148 A * 11/1992 Walls ............................ 707/204
5,715,447 A    2/1998 Hayashi et al. ............... 395/608
6,567,827 B2 * 5/2003 Bamford et al. .............. 707/203
6,807,541 B2 * 10/2004 Bender et al. .................... 707/8
2005/0027956 A1 * 2/2005 Tormasov et al. ............ 711/162
2005/0289189 A1 * 12/2005 Nettleton et al. ............. 707/200

OTHER PUBLICATIONS

Pai, et al., "IO-LITE: A Unified I/O Buffering and Caching System", Feb. 1999, 15 pages.

* cited by examiner

*Primary Examiner* — Ann Chempakaseril
(74) *Attorney, Agent, or Firm* — Gibb & Riley, LLC

(57) ABSTRACT

A method for improving the performance of a computer system when it is detected that a process wishes to gain access to and update an object while it is locked for commitment to stable storage. The process wishing to gain access to the object is provided a copy of the existing object, with this copy now being considered as the new primary copy of the object. Updates can be made to this new copy without any impact to the commitment to the stable storage and without a delay to the process making the new updates. Any future searches for the object will return references to this new copy, while the original copy is only maintained for the period required to complete it's commitment to stable storage.

17 Claims, 3 Drawing Sheets

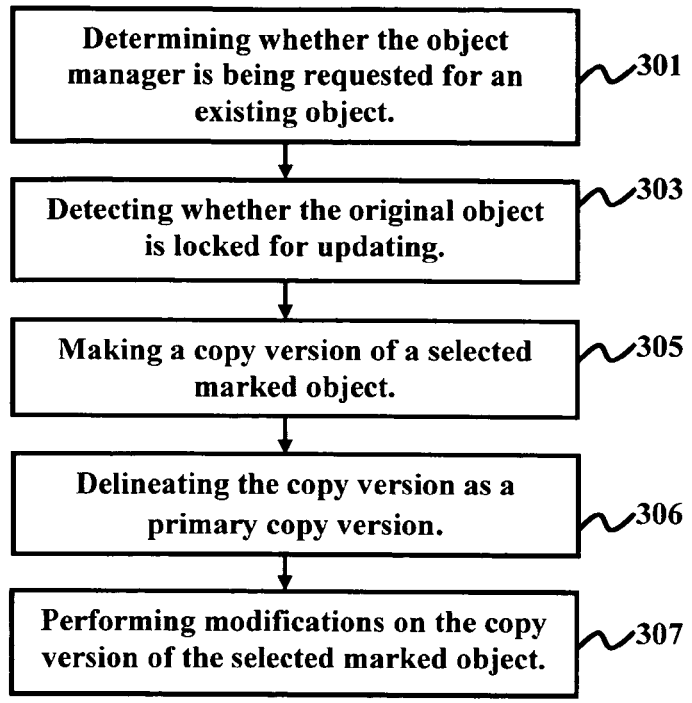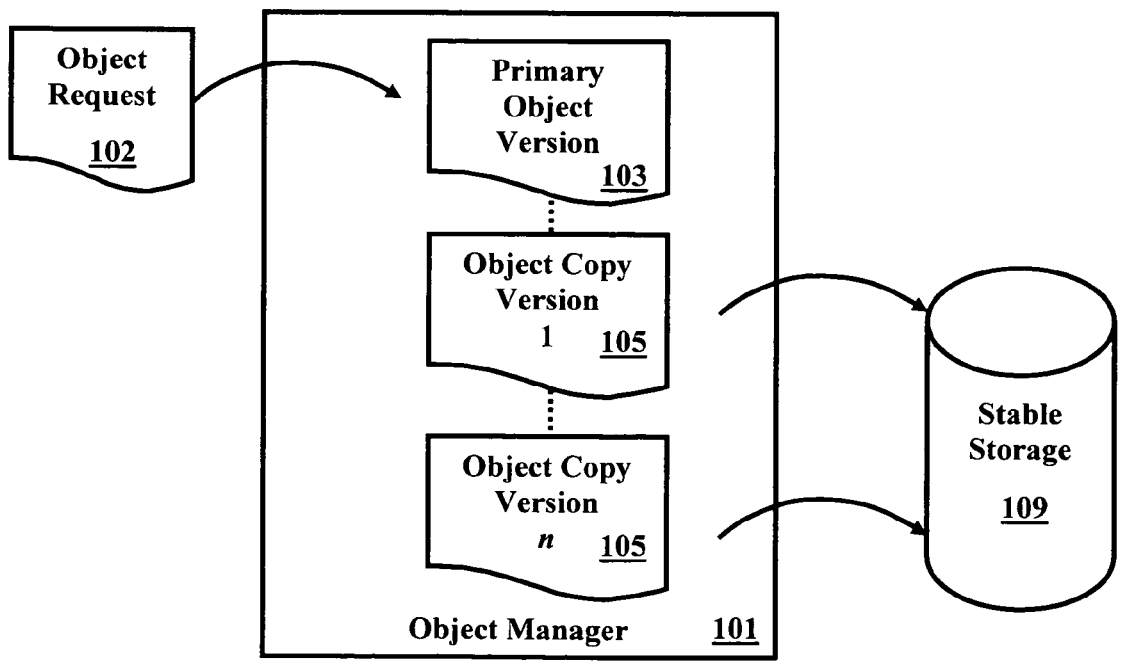

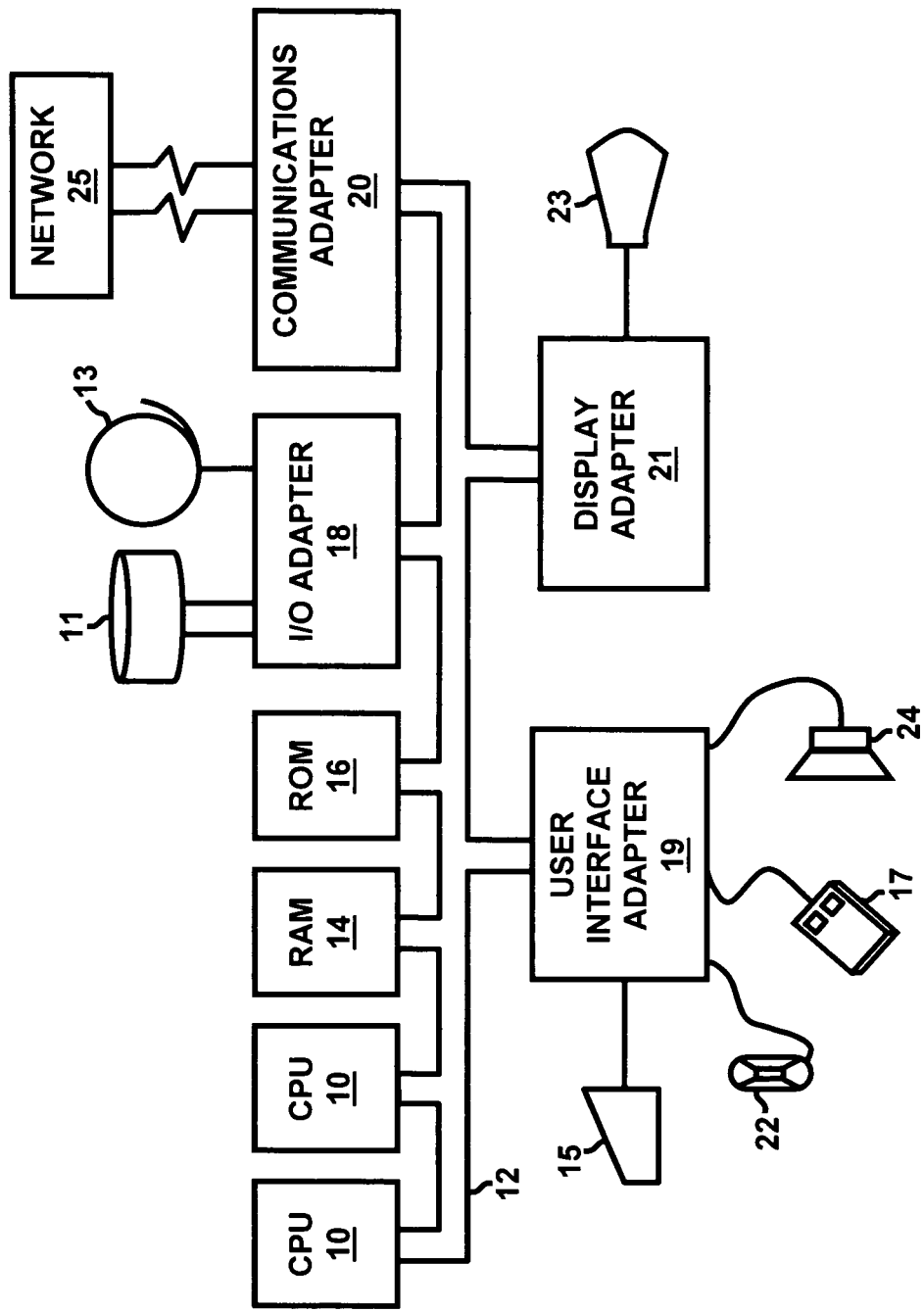

COPY ON ACCESS TO LOCKED OBJECTS

BACKGROUND OF THE INVENTION

1. Field of the Invention

The embodiments of the invention generally relate to computer storage systems, and more particularly to memory storage techniques implemented in computer data processing systems.

2. Description of the Related Art

Traditional computer systems often maintain a collection of objects in memory which they will create or read from some form of stable storage, modify, search and write to stable storage. These objects may be pages of memory managed by a virtual memory manager, pages of data managed by a relational database system or a number of other types of object.

For each such collection of objects there will be a portion of the computer operating system or application that will be responsible for managing the collection of objects. This portion of the computer operating system is a computer program providing a set of interfaces and data structures that other programs or processes may use to request the allocation of managed objects, to search for managed objects, or to request the privilege to update a managed object, etc. By having all programs or processes interact with the manager of the objects the system can maintain certain guarantees about the objects managed, such as allowing only a single program or process to update an object, or to not allow subsequent updates to occur until a previous update has been saved to stable storage, etc.

It is typical for such managers to provide a method where a program or process can lock an object and for all other programs or processes wanting to read or write this object to be forced to wait until this lock is released until they can perform their read or writes. This lock is typically set when an object has been modified and is not cleared until the object has been written to stable storage. The lock will usually consist of a mark applied to the object which is interpreted to indicate the object is locked.

If a program or process obtains the locks and then modifies a number of objects and holds the locks until the objects have been written to stable storage then it is guaranteed that all of these objects are written to stable storage in a consistent state. This type of consistency guarantee is often critical to future system operation when objects are read back from stable storage and it is important that they are consistent at that time.

The holding of locks on a series of objects for an extended period of time, such as the time often taken to write them to stable storage can become a bottleneck on the performance of the overall system. This is particularly true if one or more objects are used by multiple applications or processes in the system, which will all contend for the lock on these objects and are forced to wait until it is available.

What is required is a method where the consistency guarantee of having a set of objects locked and committed to stable storage with the consistency guarantee that the locks give, is maintained by where other programs or processes are allowed to continuing to read from and modify the objects without being forced to wait.

U.S. Pat. No. 5,715,447 issued to Hayashi et al., the complete disclosure of which is herein incorporated by reference, provides a technique for shortening the delay by copying an object, in the case of this patent an object being a buffer in a database, while it is locked and then releasing the lock immediately. The copy of the object is then written to stable storage while other modifications may be made in the original object by other applications. As such, the '447 patent provides an approach of performing the copy operation on all data that is being committed in order to avoid having any data unavailable during the write operation to stable storage, whether such data is required or not. However, while the '447 patent was adequate for the purposes for which it was designed, there remains a need for a novel system and method of data copying and writing in a memory unit of a computer system which avoids the overhead of making copies of every object that must be committed to stable storage.

SUMMARY OF THE INVENTION

In view of the foregoing, the embodiments of the invention provide a system and method of managing a collection of objects, wherein the method comprises marking objects being written to the stable storage component with a mark; if the object manager determines that a request to search for or modify a so marked object is made; making a copy version of a selected marked object; directing all future operations to the copy version of the selected marked object; delineating the copy version as a primary copy version, wherein subsequent searches by the object manager recognize the primary copy version as a most recent update of the original object; allowing the process of committing the original version of the object to stable storage to be completed; and removing the mark from the objects.

The method further comprises discarding non-primary copy versions of the selected marked objects from the system on completion of the process to commit them to stable storage. The method further comprises allowing a program or process to mark multiple objects and to allow them to be committed to stable storage with the mark being maintained on all the objects until the last object has been committed. Additionally, updates to any or all of the objects are permitted by other programs or processes during this period, via the taking of copies of the objects as described above. The method further comprises allowing the existence of multiple copies of an object to exist any point in time, with one being recognized as a primary copy and the others being maintained until they can be committed to stable storage.

The embodiments of the invention function without a performance penalty, even if the object is part of a larger collection of objects being written as part of a single transaction to the stable storage device. Additionally, the embodiments of the invention avoid the performance overhead of making speculative copies of all objects about to be written to the stable storage device.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 3 is a flow diagram of the operations an object manager will perform when it is granting access to an object while that object is being committed to stable storage according to an embodiment of the invention;

FIG. 4 is a system diagram of an object managed by the object manager where various copies exist, at a particular point in time according to an embodiment of the invention; and FIG. 5 is a computer system diagram according to an embodiment of the invention.

DETAILED DESCRIPTION OF PREFERRED EMBODIMENTS OF THE INVENTION

Figure 1:
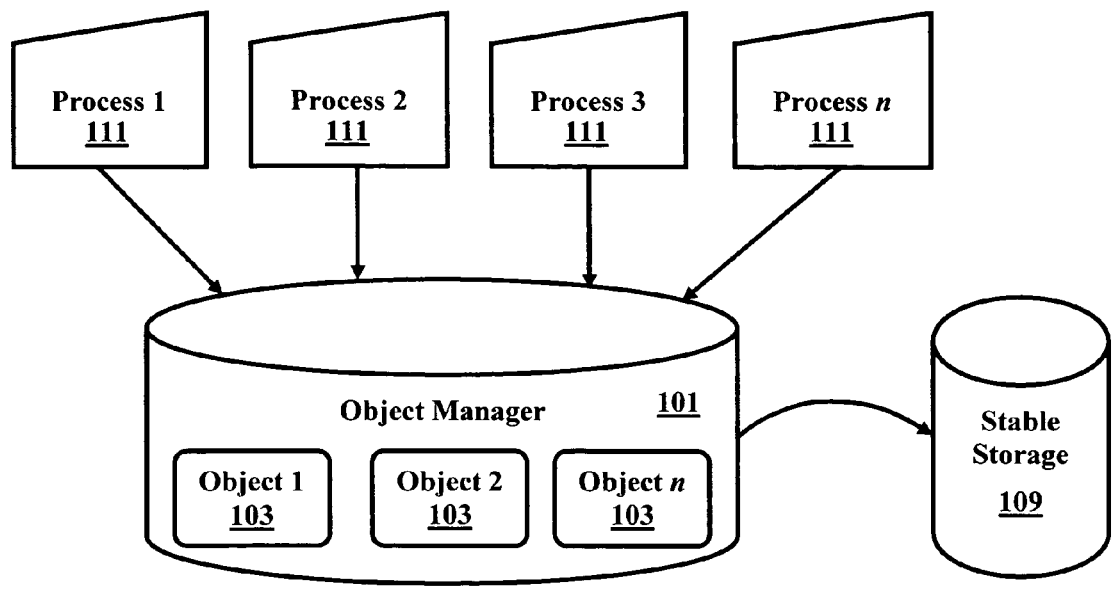
FIG. 1 illustrates the components within a system that is implemented in accordance with an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a novel system to allow objects to be written to stable storage by a computer system, with the version being written not being modified by other programs or processes running on the computer system, while other programs and processes continue to logically update them without delay. Referring now to the drawings, and more particularly to FIGS. 1 through 5 where similar reference characters denote corresponding features consistently throughout the figures, there are shown preferred embodiments of the invention.

FIG. 1 illustrates a number of processes 111 that may make requests of an object manager 101. These processes may be self contained programs running on a computer system or on other system processes or threads. These processes may make a number of different requests of the object manager 101, such as requests for access to an object 103 which is being managed by the object manager 101, or a request that the object manager 101 lock an object 103 to protect it from changes by another process, commit the object 103 to stable storage 109, or a request that the object manager 101 unlock the object 103 and allow changes by another process at the completion of the commitment to stable storage 109.

The object manager 101 internally keeps a list of all objects known to it that it is managing, shown in FIG. 1, by example, as objects 103. For each object 103, the object manager 101 keeps track of information either embedded in the object 103 or in external data structures (not shown) that point to the objects 103. This information may include whether the object 103 is locked, and may include whether the object 103 is being accessed by other processes for reading or modification and in the process of being committed to stable storage 109 in addition to any other data the object manager 101 is required to maintain for the objects 103.

Figure 2:
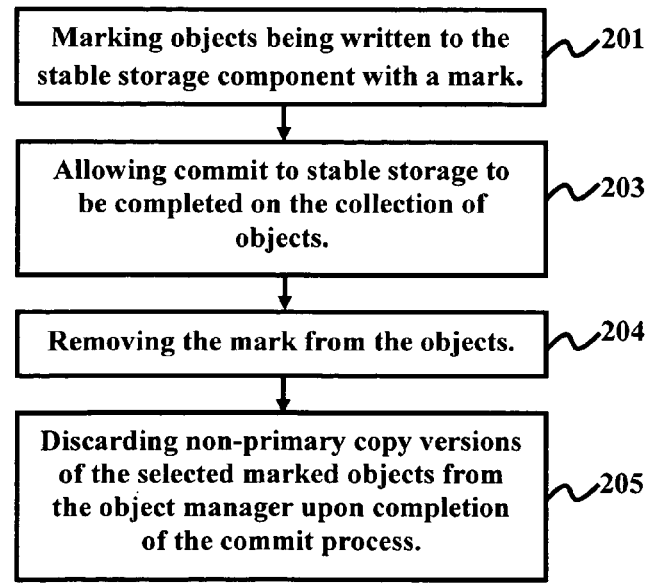
FIG. 2 is a flow diagram of the operations an object manager will perform when it is managing the operation to commit an object to stable storage according to an embodiment of the invention.

FIG. 2 illustrates a flow chart of the operations occurring in the object manager 101 when a process 111 requests that an object 103 be committed to stable storage 109. First, as indicated in step 201, the object 103 is marked as locked and the operation to commit the object 103 to stable storage 109 is initiated. This commitment to stable storage 109 may take an extended period of time, and the process 111 requesting this operation may mark other objects 103 and commit them to stable storage 109 at this time. Additionally, the process 111 may perform some other totally unrelated operation(s) or it may sit idle until the commitment to stable storage 109 is complete.

Next, in step 203, the completion of the commitment of the object 103 to stable storage 109 occurs. Once this step 203 has occurred, and potentially the completion of any other objects 103 that the process also committed to stable storage 109 at this time has completed, the mark on this object 103 that shows it is locked is removed in step 204. Finally, a check is perform in 205 to determine if the copy of the object 103 actually committed to stable storage 109 is now a non-primary copy of the object 103, and if so, this non-primary copy is discarded. Alternatively, steps 204 and 205 may be reversed or merged into a single operation.

FIG. 3 illustrates a flow diagram of the operations carried out by the object manager 101 when a process 111 requests access to an object 103 that is currently being committed to stable storage 109. Initially, the object manager 101 determines 301 if the object 103 requested does, in fact, exist and is managed by the object manager 101. The object manager 101 then performs the check to determine if the object 103 is marked as locked in step 303. If the object 103 is not locked, then the requesting process 111 is given immediate access to the object 103. If the object 103 is locked, a copy of the object 103 is made in step 305. In step 306, the copy of the object 103 is delineated as the new primary copy of the object 103. Any future requests to the object manager 101 for this object 103, and hence any searches that the object manager 101 performs internally for this object 103, will only return the copy of the object 103 marked as primary. That is, the original copy of the object 103 will not be accessed by any other process from this point on, except that which is being committed to stable storage 109. In step 307, the requesting process 111 is given access to the copy of the object 103.

FIG. 4 illustrates the various copies 105 of an object 103 that an object manager 101 may be maintaining at a point in time. If a request 102 is received to find and access an object 103 (from a process 111 shown in FIG. 1), then the primary version of the object 103 will be returned, which may be a new primary copy created at this time. At any point in time the object manager 101 may also contain non primary object copies 105 which are copies of the object 103 taken at a previous time, which are awaiting commitment or are in the process of being committed to stable storage 109. Once the commitment of these objects copies 105 is complete then they will be discarded by the object manager 101.

A representative hardware environment for practicing the embodiments of the invention is depicted in FIG. 5. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments of the invention function without a performance penalty, even if the object 103 is part of a larger collection of objects being written as part of a single transaction to the stable storage device 109. Additionally, the embodiments of the invention avoid the performance overhead of making speculative copies of all objects 103 about to be written to the stable storage device 109.

Generally, the embodiments of the invention provide a method of writing a collection of objects 103 from a pool of objects, from a memory unit of a computer system to a stable storage component 109 of the computer system, wherein the method comprises marking objects 103 being written to the stable storage component 109 with a mark; determining whether the memory unit is being searched for an original object 103 requiring modifications; detecting whether the original object 103 is locked for updating; making a copy version 105 of a selected marked object; performing modifications on the copy version 105 of the selected marked object; delineating the copy version as a primary copy version 105, wherein subsequent searches of the memory unit recognize the primary copy version 105 as a most recent update of the original object 103; allowing a write process to be completed on the collection of objects 103; and removing the mark from the objects 103.

The method further comprises discarding non-primary copy versions of the selected marked object 103 from the memory unit upon completion of the write process and allowing multiple non-primary copies of the object to exist at any point in time, wherein all non-primary copies of the object are excluded from the searches for the object 103 for use by other programs or processes 111. Moreover, updates to primary copies of the objects 105 are permitted to be made during the write process. Additionally, a process 111 may mark multiple objects 103 as locked at one time and then commit the multiple objects 103 to the stable storage 109 and refrain from releasing any of the object locks until all of the objects 103 have completed their commitment to the stable storage 109. Furthermore, in one embodiment, the objects 103 comprise a page of memory. In another embodiment the objects 103 comprise any of pages and buffers of memory managed by a database management system. Alternatively, the objects 103 may be embodied as buffers to be written to the object manager 101, wherein the object manager 101 comprises a filing system. In another embodiment, the object manager 101 comprises any of a page cache and a virtual memory management unit.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A method of writing a collection of objects from a pool of objects, from a memory unit of a computer system to a stable storage component of said computer system, said method comprising:
   marking objects being written to said stable storage component as being locked with a mark;
   receiving a request to access a first object of said objects;
   determining if said first object is marked as locked;
   if said first object is not marked as locked, granting access to said first object;
   if said first object is marked as locked:
      making a copy version of said first object;
      performing modifications on said copy version of said first object; and
      delineating said copy version of said first object as a primary copy version, wherein subsequent searches of said memory unit recognize said primary copy version as a most recent update of said first object;
   allowing a write process to be completed on said collection of objects;
   removing said mark from said objects; and
   discarding non-primary copy versions upon completion of said write process, wherein said non-primary copy versions comprise objects from which a primary copy version was subsequently made.

2. The method according to claim 1, further comprising:
   allowing more than one of said non-primary copies of said object to exist at any point in time,
   wherein all non-primary copies of said object are excluded from searches for said objects for use by other programs or processes.

3. The method according to claim 2, wherein updates to primary copies of said objects are permitted to be made during said write process.

4. The method according to claim 1, wherein a process may mark multiple objects as locked at one time and then commit said multiple objects to said stable storage and refrain from releasing any of the object locks until all said objects have completed their commitment to said stable storage.

5. The method according to claim 1, wherein said objects comprise a page of memory.

6. The method according to claim 1, wherein said objects comprise any of pages and buffers of memory managed by a database management system.

7. The method according to claim 1, wherein said objects comprise buffers to be written to an object manager, wherein said object manager comprises a filing system.

8. The method according to claim 7, wherein said object manager comprises any of a page cache and a virtual memory management unit.

9. A program storage device readable by computer, tangibly embodying a program of instructions executable by said computer to perform a method of writing a collection of objects from a pool of objects, from a memory unit of a computer system to a stable storage component of said computer system, said method comprising:
   marking objects being written to said stable storage component as being locked with a mark;
   receiving a request to access a first object of said objects;
   determining if said first object is marked as locked;

if said first object is not marked as locked, granting access to said first object;

if said first object is marked as locked:
    making a copy version of said first object;
    performing modifications on said copy version of said first object; and
    delineating said copy version of said first object as a primary copy version, wherein subsequent searches of said memory unit recognize said primary copy version as a most recent update of said first object;

allowing a write process to be completed on said collection of objects;

removing said mark from said objects; and discarding non-primary copy versions upon completion of said write process, wherein said non-primary copy versions comprise objects of from which a primary copy version was subsequently made.

10. The program storage device according to claim 9, wherein said method further comprises allowing more than one of said non-primary copies of said object to exist at any point in time, wherein all non-primary copies of said object are excluded from searches for said objects for use by other programs or processes.

11. The program storage device according to claim 10, wherein updates to primary copies of said objects are permitted to be made during said write process.

12. The program storage device according to claim 9, wherein a process may mark multiple objects as locked at one time and then commit said multiple objects to said stable storage and refrain from releasing any of the object locks until all said objects have completed their commitment to said stable storage.

13. The program storage device according to claim 9, wherein said objects comprise a page of memory.

14. The program storage device according to claim 9, wherein said objects comprise buffers to be written to an object manager, wherein said object manager comprises a filing system.

15. The program storage device according to claim 9, wherein said objects comprise any of pages and buffers of memory managed by a database management system.

16. The program storage device according to claim 14, wherein said object manager comprises any of a page cache and a virtual memory management unit.

17. A system for writing a collection of objects from a pool of objects, said system comprising:
    an object manager including a computer storage medium readably by a computer that stores said pool of objects;
    a stable storage medium readable by said computer to which said collection of objects from said pool of objects is written from said computer storage medium;
    means for marking objects being written to said stable storage medium as being locked with a mark;
    means for receiving a request to access a first object of said objects;
    means for determining if said first object is marked as locked;
        if said first object is not marked as locked, means for granting access to said first object;
        if said first object is marked as locked:
            means for making a copy version of said first object;
            means for performing modifications on said copy version of said first object; and
            means for delineating said copy version of said first object as a primary copy version, wherein subsequent searches of said computer storage medium recognize said primary copy version as a most recent update of said first object;
    means for allowing a write process to be completed on said collection of objects;
    means for removing said mark from said objects written to said stable storage medium; and
    means for discarding non-primary copy versions upon completion of said write process to said stable storage medium, wherein said non-primary copy versions comprise objects from which a primary copy version was subsequently made.

* * * * *